Nov. 10, 1936.  W. F. ALDER  2,060,009
ACOUSTIC TESTING APPARATUS
Filed March 9, 1932   6 Sheets-Sheet 1
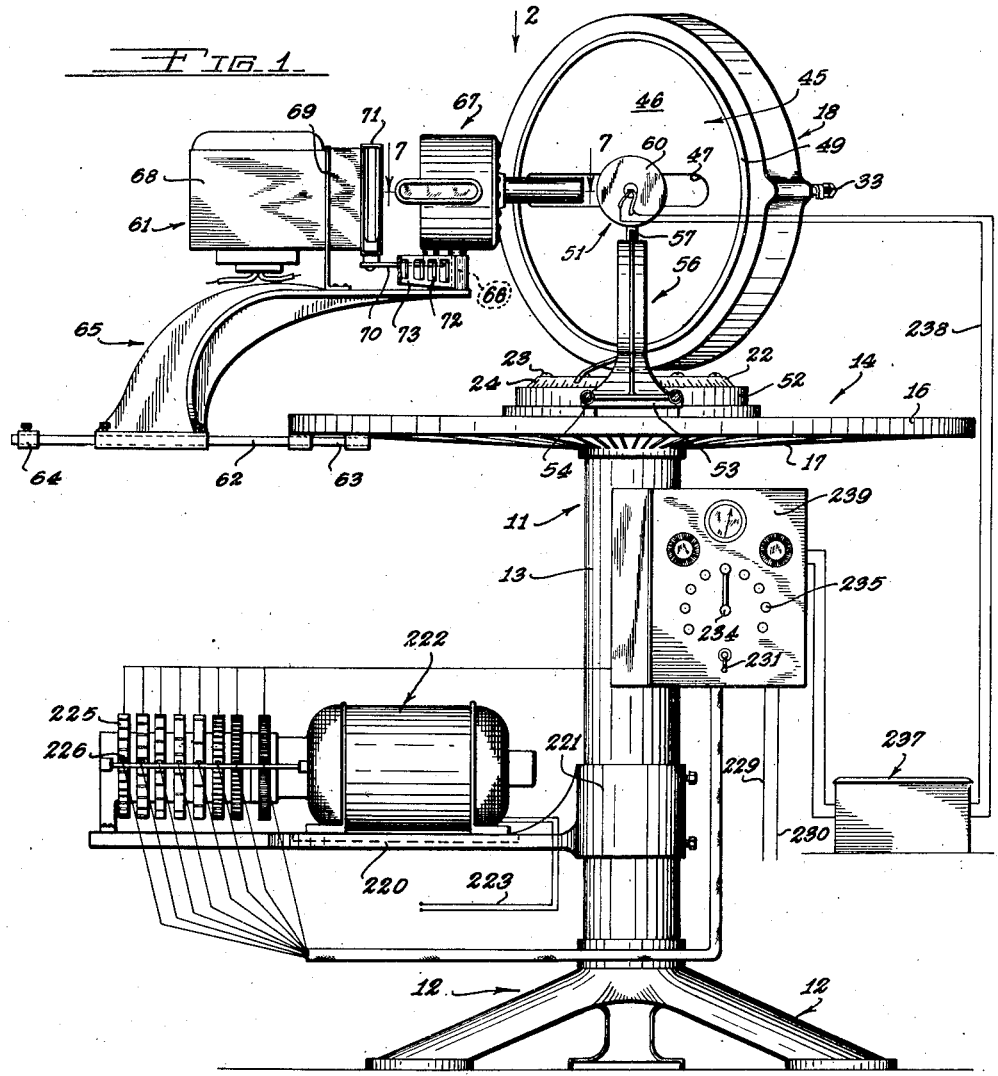
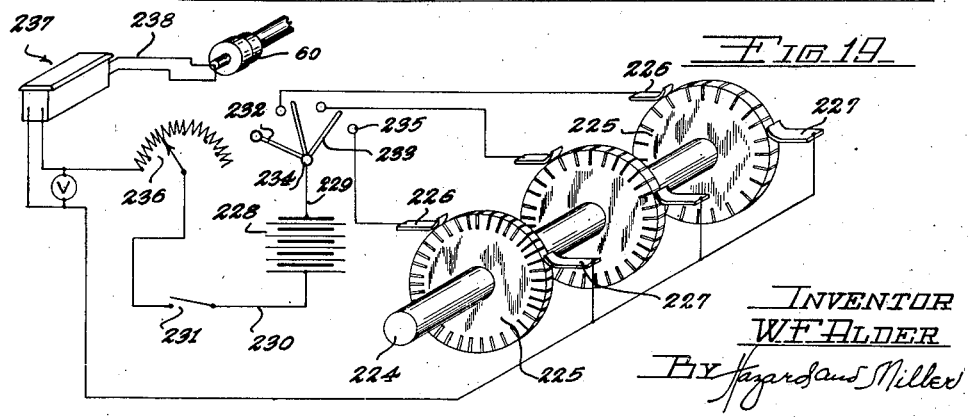
INVENTOR
W. F. ALDER
ATTORNEYS.

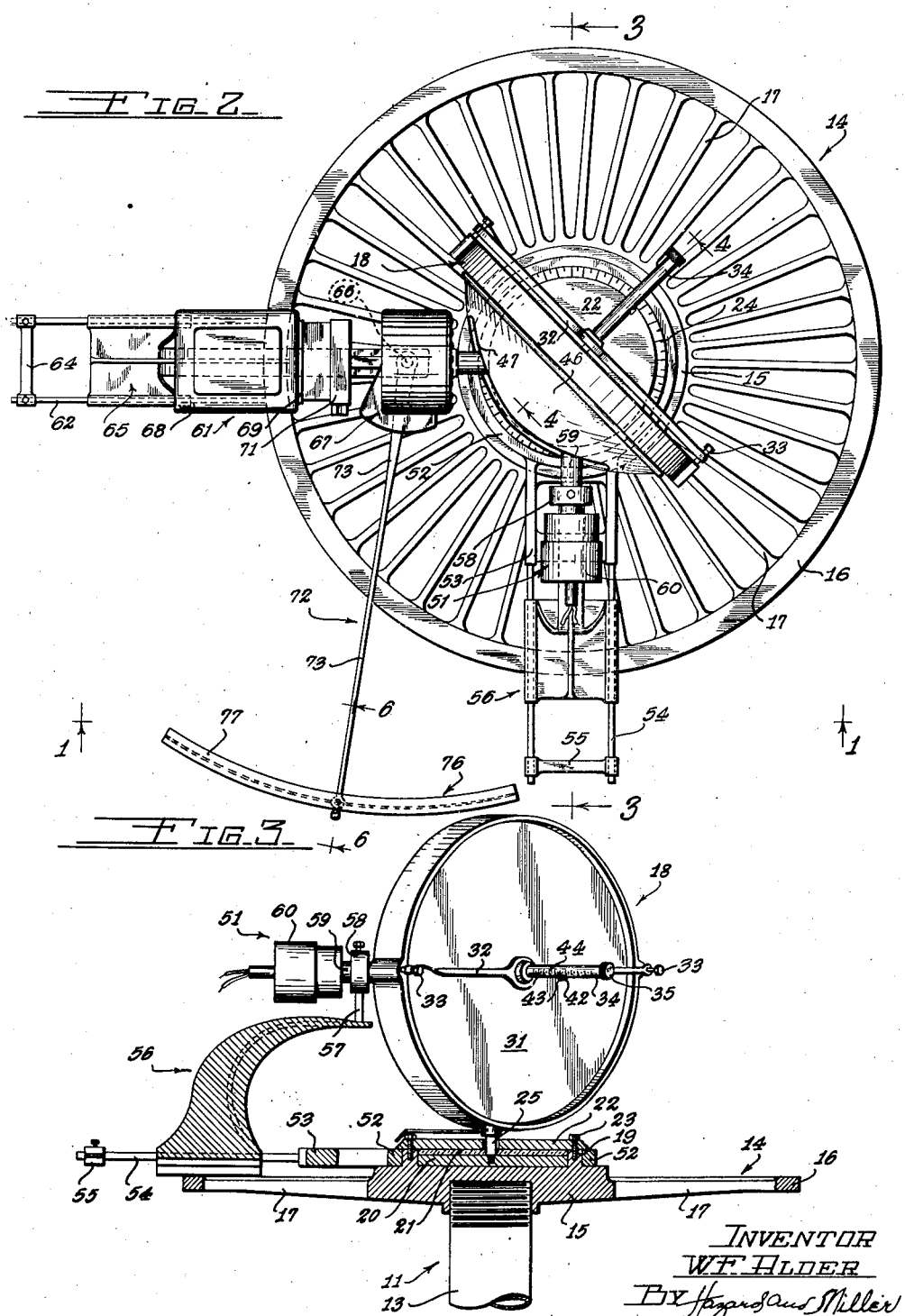

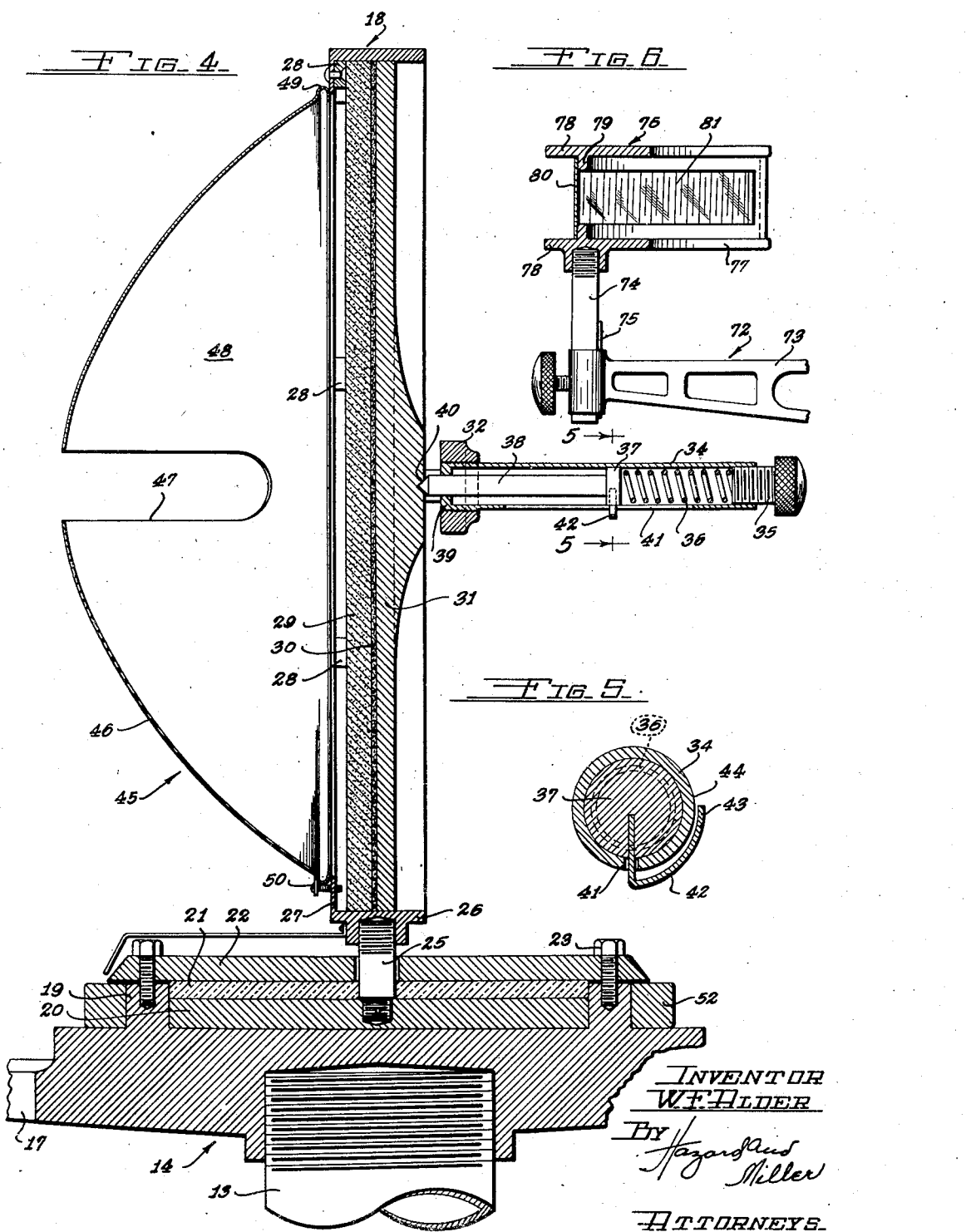

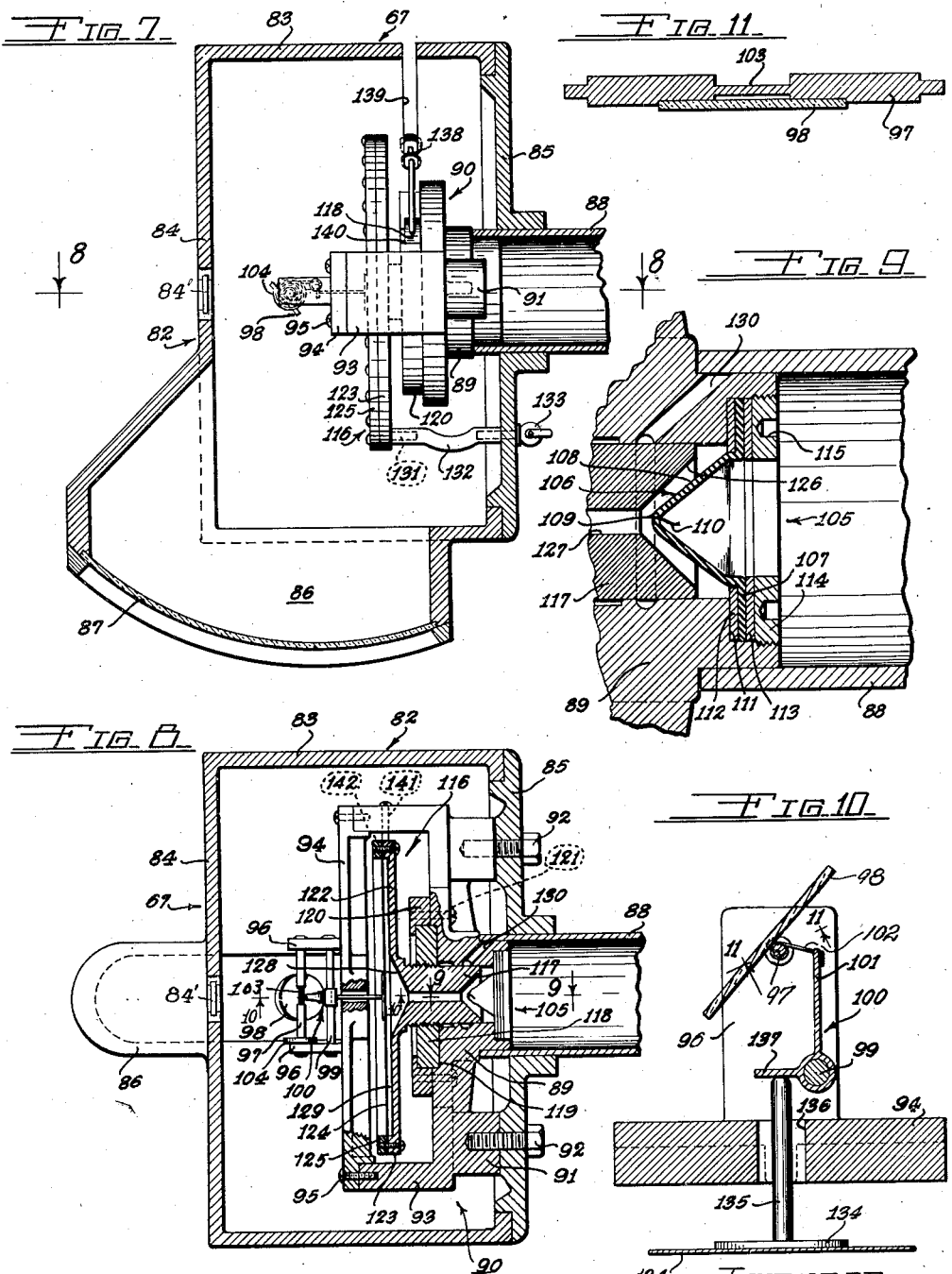

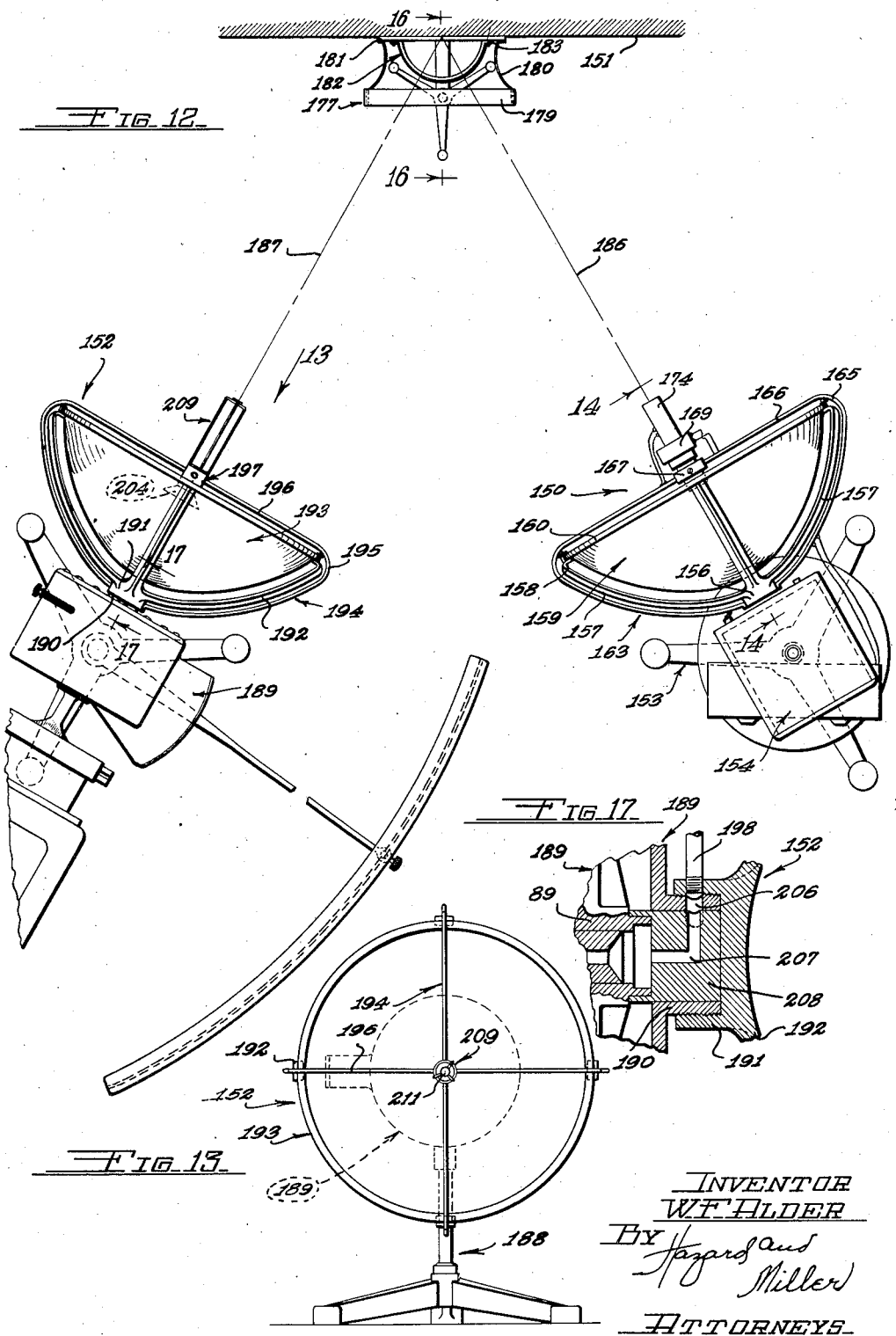

Nov. 10, 1936.                    W. F. ALDER                    2,060,009
                            ACOUSTIC TESTING APPARATUS
                    Filed March 9, 1932              6 Sheets-Sheet 6
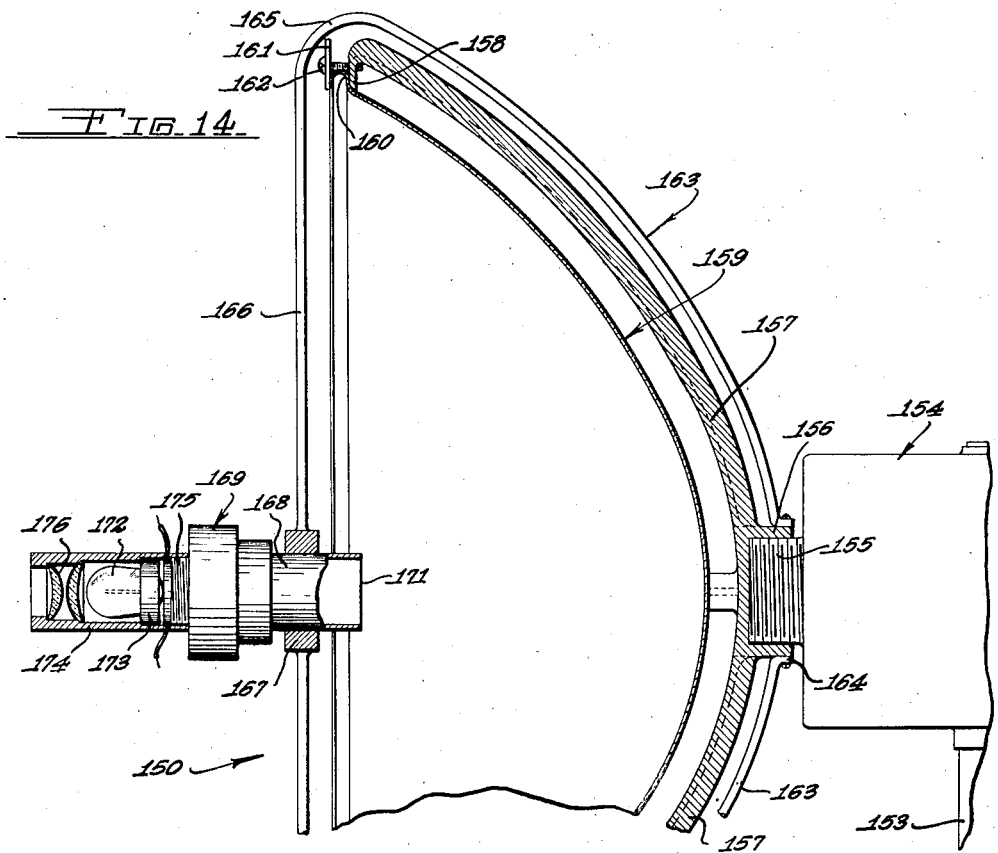
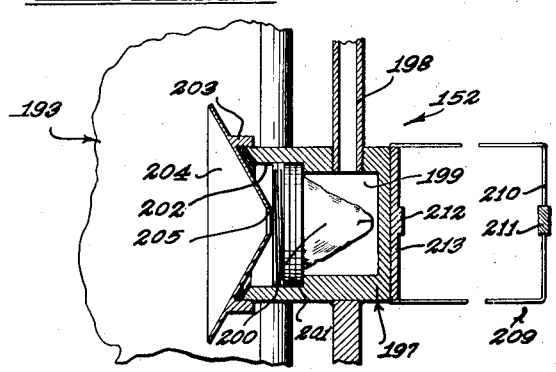
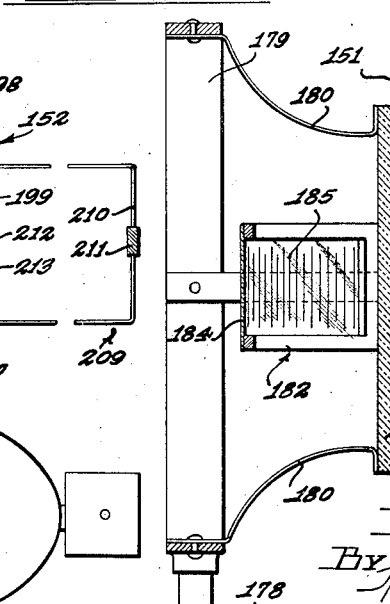
INVENTOR
W. F. ALDER
By Hazard and Miller
ATTORNEYS Patented Nov. 10, 1936

2,060,009

UNITED STATES PATENT OFFICE 2,060,009

ACOUSTIC TESTING APPARATUS

William F. Alder, Altadena, Calif., assignor, by mesne assignments, to Jenness A. Alder, Altadena, Calif.

Application March 9, 1932, Serial No. 597,828

13 Claims. (Cl. 73—51)

My invention is for making acoustic tests to determine the amplitude of sounds which may be reflected from material or transmitted through same, or sounds or noises of which it is desired to determine their acoustic value.

In one form of my present invention the apparatus is for an appliance suitable for testing samples placed in the instrument in which incident sound waves may be projected on the sample and the reflected sound waves may be tested as to their amplitude, thereby obtaining a reading of the reflection and absorption characteristics of the sample. This type may be considered as referring to a laboratory apparatus.

In a more portable type of my invention my appliances are adapted to test material while in place, such as testing walls, etc., of buildings in which an incident sound is projected on the wall or other surface to be tested and the sound reflected from it or transmitted through it is received by the sound amplitude meter, which may therefore, be used to test the relative reflecting and absorption or transmissive characteristics of the wall or other surface. In order to ascertain the angle of reflection of the sound I first make use of projected light and reflection of such light to indicate the correct set-up of different portions of the apparatus.

My invention in all forms of the apparatus may be considered as a means of teaching and demonstrating in educational institutions the various phenomena, laws, and uses of sound waves in all forms, inasmuch as both mobile and stationary sound waves can be thoroughly analyzed and demonstrated as well as those occurring in cavities.

Dealing first with the apparatus for testing samples, which may be designated as laboratory equipment, among other objects and features I employ a mounting structure for the sample to be tested enclosed in a sound chamber, this chamber being adapted to prevent the reaction of stationary waves which may be set up in the laboratory room, and also to exclude extraneous sounds or noises.

I preferably form this sound chamber by means of a hood covering the sample which is under test and which hood is provided with a slot through which the projected sounds are received on the material, the hood effecting a diffusion of the sounds over the entire surface of material under test. The slot also provides for transmission of the reflected sounds to a sound meter.

In this construction, a further object of my invention is mounting a sound source and the sound meter so that the sound may be projected on the face of the sample at desired angles of incidence and the reflected sound be received by the sound meter at the correct angle of reflection. I provide means for reading the angles so that the reflection and absorption of sound from different samples may be determined as to different degrees of angularity of the incident sounds.

In the mounting of the samples I provide for regulating the pressure on the back of said samples to obtain standardized readings.

In my improved apparatus I have certain further objects in the developing and projection of sound by obtaining a number of different frequencies of sound, preferably by operation of an electric motor having a commutator with the desired number of interruptions therein to give sounds each of a definite pitch whereby each individual pitch may be utilized alone and its amplitude changed or complex sounds may be built up by merging the sound of different frequencies.

My invention also comprehends various improvements in the sound meter in which I have developed an improved and sensitive rectifying valve admitting only the compression part of the sound waves and building up a pressure in the meter for a period of time by admitting the successive compression parts of the wave. With this, another improvement consists of a pressure release by which the pressure in the meter may be made atmospheric by the use of a relief valve. Another detailed feature of my sound meter is in the manner of transferring mechanical motion of a diaphragm to a mirror for projecting a beam of light. And in this connection a further detailed feature of my invention relates to a mounting for a light source and the mounting of a scale on which the projected beam or spot of light may be noted.

My portable type of apparatus is designed more for testing materials in position by projecting sounds on such material and reading the amplitude of the reflected sounds and hence, obtaining their characteristic of absorption or for projecting the sounds through the materials under test. The sound meter of this type of apparatus may be used for obtaining readings of noises or other types of sounds independent of testing material.

With this type of portable apparatus, certain objects and features of my invention relate to the projecting of what might be termed beams of sound in a more or less well defined path, this being by use of the proper reflecting surfaces in the sound producer. In the sound receiving instrument, that is, the sound meter, I also provide for concentrating the beam of sounds in order to make the instrument more sensitive, and for this purpose, I find it expedient to employ a parabolic reflector in which the sound is concentrated with the focus of the reflector.

Another feature in relation to my portable apparatus for testing materials in place is to define the position of the projecting and sound receiving parts of the apparatus by first projecting a pencil of light and receiving the reflection of such pencil, and by this means ascertaining the path which will be followed by sound projected in the meter in the directed beam. For this preliminary test by light of the path of a sound from a parabolic reflector I provide a light projector projecting a pencil of light in the axis of the sound reflector. This pencil of light is projected on a portable mirror which may be placed adjacent the material to be tested and by means of a scale the angles of the incident and reflected rays may be read and, hence, the sound meter for receiving the reflected sound may be set in the proper place. This latter instrument is positioned with the axis of its reflector in alignment with the reflected ray of light.

My present invention may be considered as a further development of my former application for Apparatus and method for determining amplitude of sound, filed October 22, 1931, Serial No. 570,486.

My invention is illustrated in connection with the accompanying drawings, in which:

Fig. 1 is a vertical elevation on the section line 1—1 of Fig. 2 in the direction of the arrows, this illustrating a laboratory type of instrument for testing samples of materials;

Fig. 2 is a plan taken in the direction of the arrow 2 of Fig. 1;

Fig. 3 is a vertical section on the line 3—3 of Fig. 2 in the direction of the arrows, illustrating, however, the sample support in elevation and the sound source in elevation;

Fig. 4 is an enlarged vertical section through the sound support on the section line 4—4 of Fig. 2 in the direction of the arrows;

Fig. 5 is a detailed transverse section on the line 5—5 of Fig. 4 in the direction of the arrows through the pressure indicating device;

Fig. 6 is a detailed section on the line 6—6 of Fig. 2 in the direction of the arrows, showing the mounting of the scale for obtaining the reading of the pencil of light from the sound meter;

Fig. 7 is a horizontal detailed section on the line 7—7 of Fig. 1 through the sound meter;

Fig. 8 is a vertical section on the line 8—8 of Fig. 7 in the direction of the arrows;

Fig. 9 is a section on the line 9—9 of Fig. 8 in the direction of the arrows through the rectifying valve;

Fig. 10 is a section on the line 10—10 of Fig. 8 in the direction of the arrows, showing the connection from a diaphragm to a reflecting mirror;

Fig. 11 is a section on the line 11—11 of Fig. 10 in the direction of the arrows, showing the manner of mounting the mirror and oscillating such mirror;

Fig. 12 is a plan showing my portable type of apparatus for making acoustic tests of material in position;

Fig. 13 is a front elevation taken in the direction of the arrow 13 of Fig. 12 of the sound receiving units;

Fig. 14 is an enlarged section on the line 14—14 of Fig. 12 in the direction of the arrows through the sound projecting instrument;

Fig. 15 is an enlarged section of the rectifying valve used in the construction of Figs. 12 and 13;

Fig. 16 is a vertical section on the line 16—16 of Fig. 12 showing a mounting for a test mirror on a wall face;

Fig. 17 is a detailed section on the line 17—17 of Fig. 12 showing the connection to the sound amplitude meter;

Fig. 18 is a diagram showing the sound projector and sound receiver on opposite sides of a wall;

Fig. 19 is an electrical diagram illustrating the frequency developing apparatus.

My invention as to the laboratory type of instrument is substantially as follows, having reference particularly to Figs. 1 through 11. In this case I employ a stand 11 which is illustrated as having legs 12, a pedestal 13, a table 14, which table is provided with a center block 15, a rim 16, with connecting radial arms 17. The sample or specimen holder designated generally at 18 is mounted on the center block of the table, which center block is illustrated as having an annular rib 19 with a disk 20 fitted tightly inside of the rib. A packing 21 is on top of this disk and a protractor disk 22 rests on the rib, being secured by screws 23. This has graduations 24 on its periphery. A stud 25 is secured to the disk 20 and on this the specimen holder 18 is rotatably mounted on the disk 20. The stud carries a ring 26 with an inturned flange 27, secured to which rim there are spacing blocks 28. The specimen or sample 29 to be tested is constructed to fit in the rim 26 and is preferably a disk. A packing sheet 30 of compressible material is placed against the back of the sample and on the back of this there is a pressure plate 31. This pressure plate is held in position by means of a cross bar 32 which is secured to the rim 26 by screws 33. A tube 34 is secured to this crossbar and has a plug 35 screwed into its outer end. A compression spring 36 bears against the stud and also against the head 37 of a pressure stem 38, which stem is guided through an opening in the closed end 39 of the tube 34 and has a pointed end 40 engaging the back of the pressure plate 31. A longitudinal slot 41 extends along the bottom of the tube 34 and through this extends a pointer finger 42 which is secured to the head 37 and has a pointer end 43 which is contiguous to graduations 44 which are placed on the side of the tube. By this means, a person in fitting samples of the same thickness may bring the same pressure to bear on the back of the sample and thus compress the packing 30 to the same extent by having the pointer 43 at the same graduation.

A cover structure 45 is formed, preferably, of sheet metal and in the shape of a dome 46. This has an elongated slot 47 for the purpose of inserting the resonators of the sound projector and of the sound receiving or meter part of the instrument. This cover forms a partially closed chamber 48 in front of the sample 29. This is secured to the flange 27 by means of a rim or bead 49 engaging the flange 27 and being held in place by screws and washers 50.

The sound transmitter or projector designated by the assembly numeral 51 is mounted by means of a ring 52 which encircles the center block 15 of the table and rests thereon, being held in place by the protractor disk 22. This ring has a lateral extension 53 with a pair of outwardly extending guide arms 54 connected by an adjustable end spacing bar 55 at the outer end. On these bars there is slidably mounted a bracket 56 which is of a substantial character. This bracket has a short post 57 at its outer end and this post forms the mounting for a ring 58. From this ring a resonator 59 extends through the slot 47 and points toward the sample under test. A sound unit 60, which may be of the standard type of loud speaker, is used as a generator of sound. This may be of a standard character.

The sound meter assembly designated generally by the numeral 61 has a mounting comprising a pair of guide rods 62 with their inner ends 63 secured to the under side of the table 14. These rods have an adjustable spacing bar 64 at their outer ends. A bracket 65 is adjustably mounted on the rods 62 and at its inner end carries a stud or short post 66 on which is mounted the sound meter unit 67. A lamp box 68 enclosing an electric lamp forming a source of light is supported by an upright arm 69, which is attached to the bracket 65. A horizontal arm 70 is secured to the under side of the sound meter unit and supports a shutter holder 71 which may be utilized with shutters for shutting off the light from the lamp box without extinguishing such light or for using light filters, if desired.

A scale mounting designated generally 72 utilizes an arm 73 which is mounted on the post 66 which supports the sound meter unit and at the outer end of this arm there is an adjustable short post 74 (note Fig. 6) which is vertically adjustable in the outer end of the arm and has a key 75 or other means to restrict rotation of such post. A scale holder 76 is formed by an arcuate frame 77, this frame having upper and lower flanges 78 and a rim 79 forming an arc of a circle, and on the outside of this rim there is placed a celluloid or other transparent strip 80, this having graduations 81 thereon. The beam of light from the sound meter swings over this scale.

The particular form of the sound meter 67 is illustrated particularly in Figs. 7 through 11. This employs a housing structure 82 which is supported by the post 66. This structure has, preferably, a cylindrical side wall 83, a flat back wall 84 with a window 84', and a removable front plate 85. An extension 86 is formed on one side and this has an arcuate window 87.

A resonator or sound receiving tube 88 extends through the front plate 85 of the housing 82 and is connected to a hub structure 89 on a yoke 90, which yoke is supported on lugs 91 which are attached to the plate 85 by screws 92. The yoke has a pair of arms 93 which carry a transverse bar 94 attached thereto by screws 95, which bar has a pair of journal lugs 96 attached thereto in which there is mounted a shaft 97 carrying the mirror 98. A rock shaft 99 is also carried by the lugs 96. This latter has a bell crank 100, the long arm 101 of which has a fine thread 102 attached thereto, which thread is wound on a neck 103 on the shaft 97. A tension spring 104 interconnects the shaft 97 and one of the lugs 96 and exerts a tension to return the mirror to its normal position.

The light from the lamp in the lamp box 68 shines through the holder 71 and through the window 84' in wall 84 of the sound meter unit 67 onto the mirror 98, and is reflected by the mirror through the window 87 to the scale 81.

The sound meter has a rectifying valve assembly 105 in which I employ a rectifying valve 106. This valve is formed with an annular flange 107, a conical portion 108, which portion at the apex 109 has a slit 110. The valve is seated on the hub 89, this having a recess 111 with a packing 112 fitted on the base of the recess, a second packing ring 113 on the opposite side of the flange 107 and a clamping nut 114, which nut has wrench sockets 115 and is screw threaded into the end of the hub 89.

The sound chamber structure 116 has a block 117 which is threaded into a ring 118, which ring fits in a slight recess 119 in the yoke 90 and is held by a clamping ring 120, there being screws 121 for holding this in place. The block 117 is, therefore, rotatable in the ring 118. This block has a disk 122 formed integral therewith, and attached to a rim 123 on this disk there is a flexible diaphragm 124. A clamping ring 125 holds the diaphragm 124 in position. The block 117 is illustrated as having a conical mouth end 126, an air passage 127 therethrough, and a coned end 128 adjacent the diaphragm. An oil or grease duct 130 extends through the hub 89 from the block 117 to the resonator tube 88 in order to form an oil tight seal and prevent escape of air at the inner end of the resonator. An air vent 131 is provided from the air chamber 129. This is illustrated as having a flexible tube 132 connecting from the disk 122 through the front plate 85, and being controllable by a relief valve 133.

The connection from the diaphragm to the mirror is by means of a plate 134 secured to the diaphragm, this having a stem 135 operating through an opening 136 in the bar 94. The end of the stem bears against the short arm 137 of the bell crank 100. The valve is a rectifying valve and operates on the pressure or condensation portions of the sound wave to cause the opening of the slit 110 admitting the compressed air into the air chamber 129, which causes an expansion of the diaphragm 124 whereby the stem 135 operates the bell crank, thrusting against the arm 137 and swinging the long arm 101 to exert a tension on the thread 102, which action rocks the shaft 97 and oscillates the mirror. Hence, the incident ray of light from the lamp box impinging on the mirror is reflected by such mirror through the window 87 to the arcuate scale carried by the sound meter. The zero setting may be obtained by a rod 138 which extends through a slot 139 in the cylindrical side wall 83 of the housing structure 82. This is connected to the ring 118, the ring 120 having an arcuate cutout section 140 to allow passage of the rod 138. A pin 141 in one of the arms 93 of the yoke 90 engages in a longitudinal slot 142 in the periphery of the rim 123 and the ring 125. This prevents rotation of the disk 122 and block 117 so that on partial rotation of the ring 118 such block 117 and the disk 122 have a slight longitudinal motion. This operates to set the mirror to obtain a zero reading. The operation is substantially similar to that shown in my patent application above mentioned for adjustment of the diaphragm and mirror.

From the above construction it will be seen that samples of various material to be tested, such as samples of different wall plasters, may be placed in the sample holder, the sound producer with its resonator may be so adjusted on the table 14, and the sample holder rotated to the proper position so that the projected sound on reflection from the surface of the sample is picked up by the resonator of the sound meter. The sound source, which, as above mentioned, is preferably a loud speaking unit, is energized in a manner hereinunder described. Any suitable type of sound source may be utilized. I desire to have this, however, so that sounds of different definite frequencies may be utilized to test the reflection and, hence, by deduction, the absorption qualities of the sample. The sound chamber in front of the sample prevents standing waves in the room or laboratory in which the instrument is installed from having an effect on the action of the projected and reflected sounds of definite frequencies. The hood, also, prevents extraneous noises from interfering with the action of the sound meter, and on account of using resonators at both the sound source and for the meter, the meter only reacts to the frequencies desired. Tests of the reflection characteristics of different samples may be obtained over a wide angle of incidence. It will be seen by the above description, together with the drawings, that the instrument so far described is mainly suitable for a laboratory device to test samples of material made up especially for test or removed from walls for testing.

It is, however, frequently desired to test materials in place as to their sound reflection and sound absorption qualities and their qualities of transmitting sound directly through the material. These tests may be made by what I term a portable apparatus, this being illustrated particularly in Fig. 12 through 16.

In this apparatus, referring first to Fig. 12, I employ a sound projecting instrument 150 which is adapted to project sound in a desired direction, the projected sound being illustrated as impinging on a wall surface 151 and from there reflected to the sound meter instrument 152.

Referring specifically to the sound projector, this utilizes a stand 153 (note Fig. 14) on which is mounted a box 154. This box is illustrated as having a threaded stud 155 connected thereto. On this stud there is threaded a hub 156 and from such hub extend curved spider arms 157, each of which arms has an inturned end 158. A parabolic reflector 159 has a bead or rim 160 which is secured to the ends 158 of the arms by means of a washer 161 and securing screw 162. The reflector is spaced from the arms and cannot contact therewith. If desired, a pad may be used at the bead 160.

There are a series of supporting arms 163 attached at one end 164 to the hub 156. These extend outside of the arms 157 and have a bend 165 around the periphery of the reflector. These arms have radial sections 166 which terminate in a hub 167. Mounted in this hub there is a sound tube 168 which is connected to a loud speaker unit 169 forming the sound source. The tube 168 has a mouth 171 and such tube is adjustable in the hub 167 so that the opening 171 may be at the focus of the parabolic reflector. The sound waves from this opening then diffract to all parts of the reflector. The sound source may be energized in any suitable manner, such as hereinunder detailed.

In order to determine the path of the projected sound which is projected in a definite direction by the parabolic reflector I employ a light source. This is constituted by a lamp 172 which is mounted on a suitable base 173 and installed in a lamp tube 174 illustrated as threaded on the stud 175 on the back of the sound source unit 169. A system of lenses 176 is used to form a pencil of parallel light rays. The axis of the light tube 174 and, hence, of the optical system, is in the axis of the parabolic reflector. Therefore, the axes of the pencil of light and of the projected sound coincide. In order to determine the path of the reflected sound from a wall, I employ a portable reflecting instrument designated by the assembly numeral 177. This employs a stand 178 on which is mounted a vertical ring 179, which ring carries a series of spring arms 180 and to these arms there is attached a preferably circular mirror 181, the back of the mirror being adapted to be positioned against the wall from which the sound is to be reflected (note Figs. 12 and 16). In order to determine the angle of incidence and angle of reflection of the light I construct an arcuate frame 182. This has feet 183 secured to the mirror or to the sides thereof and on this frame there is an arcuate transparent strip 184, preferably of celluloid having a protractor giving the angles 185. Therefore, the angle of the incident pencil of light 186 and the reflected light ray 187 may be read.

The sound meter instrument employs a suitable stand 188 (note Figs. 12, 13, and 15). This has the sound meter box 189 mounted thereon, the box having a threaded stud 190 on which is mounted the hub 191. This hub has a series of arcuate arms 192 in which is secured the parabolic reflector 193, the mounting of the reflector being substantially the same as that of the sound projector, as shown in Figs. 12 and 14. A series of arcuate supporting arms 194 also extend from the hub 191, at least one of these being a hollow tube. They have a reverse curve portion 195 and radial portions 196 terminating in a valve box 197. The tubular arm is indicated 198, leading to the sound chamber 199 in which chamber extends the rectifying valve 200 which may be held in place by packing washers and a nut 201 similar to the mounting shown in Fig. 9. The nut is fitted in a recess 202 in the valve box 197 and on this there is threaded a sleeve 203 which has a cone-shaped sound receiver 204 with a small opening 205. The screw threaded adjustment is so that the opening 205 in the cone may be placed substantially at the focus of the parabolic reflector so that all of the sounds received by such reflector come to a focus at this point, and the compression portions of the sound waves pass through the rectifying valve and build up an air pressure through the chamber 199 and the hollow tubular arm 198.

This arm connects to the hub 191 (note Fig. 17) and such sound waves pass through an arcuate slot 206 in the threaded stud 190 and thence through the angular perforation 207 of a plug 208, which is fitted on the hub structure 89 similar to that of Fig. 8. The remaining portions of the sound meter are the same as illustrated in connection with Figs. 7 and 8. Thus, the compression sound waves from the remote rectifying valve build up the air pressure in the sound chamber back of the diaphragm and actuate the mirror to project the light on the scale. A lamp box for supplying the source of light is mounted in connection with the sound meter in substantially the same manner as in the prior illustrations.

The means for aligning the sound receiving parabolic reflector in the axial line of the reflected light from the wall mirror is by means of a wire frame 209 (note Figs. 12 and 15), which wire frame is secured to the valve box 197. This carries a spider 210 on the outside and centrally of this spider there is an imperforate disk 211. A circular spot 212, preferably blackened, is constructed on the surface 213 of the valve box so that when the axial line of the parabolic reflector of the sound receiver is on the line of the reflected pencil of light 187, the shadow cast by the disk 211 corresponds with the black spot 212 on the face 213. This places both of the parabolic reflectors of the sound source and sound receiver in correct axial line for projecting and receiving sound. The mirror is then removed and tests are made by projecting sounds of a desired pitch and intensity.

Where it is desired to test the transmission characteristics of a wall or sample, the instruments may be set up as illustrated in Fig. 18. In this case the sound projecting instrument 150 is placed on one side of the wall 214 and the sound meter is placed on the opposite side.

The sound meter with the parabolic reflector may be utilized as a device for measuring the intensity or amplitude of noises of any character independent of any particular pitch, and the sound meter may be utilized to measure the intensity of such noises taken either more or less direct from their source or as reflected from walls, or such noises being transmitted through walls. It will thus be seen that by use of my portable meter I may set this up any place independent of a laboratory and measure the intensity of noises or other sounds.

A convenient way to energize the sound source and to obtain an accuracy of pitch is by a construction illustrated particularly in Fig. 1. In this an adjustable supporting platform 220 is formed integral with the sleeve 221 which is mounted on the pedestal 13. This supports an electric motor 222 which receives its energy through the feed wires 223, this being, preferably, an alternating current motor of the synchronous type (note Figs. 1 and 19). The motor is provided with a shaft 224 on which there are a series of commutators 225. There are a pair of brushes 226 and 227 for each commutator. The brushes 226 receive their direct current power from a battery 228, preferably a storage battery, in which there are leads 229 and 230. A main switch 231 is installed in the circuit and a selective switch 232. This selective switch is illustrated as having a series of bridging arms 233 so that a bridging contact may be made from a center point 234 to the contacts 235. This is for the purpose of making connection to a single commutator to obtain a definite frequency, producing a pure note of such frequency, or two or more contacts may be bridged together, thus to impose the frequencies of two or more commutators. This may be done to give a low frequency with a higher multiple frequency and thus obtain upper harmonics of the low frequency. A control rheostat 236 is in the circuit and an amplifier designated by the assembly 237. This is of any suitable type, using amplifier tubes which have leads 238 to the loud speaking unit 60. By this construction the motor is driven at constant speed and develops by the commutators predetermined frequencies and, hence, the loud speaker produces the tones with which it is desired to test the material. A convenient mounting for the switches and the rheostat with other electrical instruments is on a panel board 239 which is illustrated as supported by the pedestal 13.

In the design of the brushes on the commutators the brushes should be of varying width to compensate for the bar area for different spacing on the commutators and speeds in order to develop a constant electromotive force and current output.

An important characteristic of my invention is that the material under test for sound reflection and sound transmitting characteristics may be substantially enclosed on the site of the source of sound and therefore is not subjected to sounds extraneous to those to be used in the test, also, where sounds are to be reflected and the absorption characteristics determined by the reflected sound said reflected sounds are also obtained from the substantially closed space. The closure hood may be placed either over a specific sample or over a wall surface.

A further important feature of my invention relates to the type of rectifying valve responsive to the compression phases of the sound wave. This valve responds to both rhythmic and non-rhythmic vibrations such as noises and operates to permit building up of an accumulated air pressure in the sound amplitude instrument. It is quite obvious that the rectifying valve may be operated in a liquid as well as in a gas and may thus be used under water.

Another characteristic of the present invention is the use of a relief valve for the sound chamber. Therefore, periodically the air pressure may be released after the sound has been rectified and the pressure built up to a predetermined period. Therefore, by determining the amount of air pressure built up in a series of the same time intervals an accurate average of the results may be obtained.

I have illustrated the sound chamber as being of the expansion type, that is, the diaphragm 124 is flexed outwardly when the pressure increases, and this diaphragm is connected to a mechanical construction for indicating the pressure, and hence an amplitude of sound. It is obvious that other constructions different from this mechanical arrangement may be used.

As regards my invention of the Sound rectifying valve, the type I use in this instrument may be interchanged with those of my other applications, or vice versa, such as the application referred to above, or my subsequent applications: Portable closed chamber determination of sound absorption, filed July 20, 1932, Serial No. 623,570; Gravimetric determination of sound amplitudes, filed July 20, 1932, Serial No. 623,571; Hydrostatic sound amplitude meter, filed September 21, 1932, Serial No. 634,190.

Various changes may be made in the details of construction without departing from the spirit or scope of the invention as defined by the appended claims.

I claim:

1. In an acoustic testing apparatus, a sound amplitude instrument having a rectifying valve formed of flexible material conical in shape with a slit at the apex of the cone, an air chamber connected to the valve and having means to indicate changes of pressure in such chamber.

2. In an acoustic testing apparatus, an amplitude instrument having a rectifying valve, an expansion chamber connected thereto, said chamber having a diaphragm, a stem connected to the diaphragm, a bell crank operated by the stem, a rotatably mounted mirror, and a flexible connection from the bell crank to the mirror to rotate said mirror in accordance with the movement of the diaphragm.

3. In an acoustic testing apparatus, the combination of a sound projector having an opening for projection of sound, a parabolic reflector, means to position said opening at substantially the focus of the reflector, means to position the axis of the reflector to project sound in a predetermined direction on a wall, a sound receiving instrument having a reflector to concentrate the received sound to a focus, and a sound responsive sound amplitude meter receiving the focused sound, means to position the sound projector and the sound receiving instrument in the proper position to transmit and to receive reflected sounds, comprising a light projector positioned to project light on the axis of the projected sound, means to reflect light from said wall, and a light receiver connected to the sound receiving instrument having means to indicate the reflected light being received on the same axis as the reflected sound.

4. In an acoustic testing apparatus, a sound rectifying valve formed of flexible material and having a narrow slit in a resilient flexible portion through which a portion of the medium transmitting the sound may pass during condensation phases of a sound wave, said slit closing on the rarefaction phases of the sound wave, a confining means for the medium passing the valve, and means to indicate the static pressure of the confined medium.

5. In an acoustic testing apparatus, a sound rectifying valve formed of flexible materal conical in shape with a slit at the apex of the cone, such slit permitting the passage of a part of the sound transmitting medium during the compresion phases of the sound wave, and said slit closing to prevent the passage of the medium during the rarefaction phases of the sound wave, a confining means for the medium passing the valve, and means to indicate the static pressure of the confined medium.

6. In an acoustic testing apparatus, a parabolic reflector, a sound projector having an opening facing the reflector, the axis of the opening coinciding with the axis of the reflector, said opening being positioned at substantially the focus of the reflector whereby the projected sounds diverge from the opening to different portions of the reflector and are reflected by such reflector past the sound projector, the sound projector having a source of light mounted thereon, and means to project such light along the axis of the projector.

7. In an acoustic testing apparatus the combination of a light projector with means to project light along an axis, means to project sound along the same axis, a sound receiver having means to receive and indicate the projected light to facilitate the alignment of the sound projector and receiver, the sound receiving instrument therefore receiving the sound from the same direction as the received light, and a sound responsive amplitude meter connected to the sound receiving instrument.

8. In an acoustic testing apparatus the combination of a first parabolic reflector, a source of light and means to project such light in the axis of the reflector, a sound projector positioned to project sound from substantially the focus of the reflector to the surface of said reflector, the sound being reflected by the reflector along the axis of the reflector, a second parabolic reflector having a light receiving means to receive the projected beam of light or the reflection of such beam, the axis of said second reflector conforming to the axis of the light receiving means, and a sound amplitude meter connected to the second parabolic reflector to receive sound at substantially the focus of such second reflector.

9. In an acoustic testing apparatus, a receiver for sound waves comprising a supporting structure with a rectifying check valve formed of flexible material therein, said check valve being firmly supported at its entire periphery and having a central resilient portion free to flex and open on the compression phases of the sound waves and to close on the rarefaction phases, thereby trapping a portion of the sound transmitting medium on each compression phase of the sound waves, a structure having an expansible chamber in which the sound transmitting medium is trapped, and means to indicate the expansion of such chamber.

10. In an acoustic testing apparatus as claimed in claim 9, the structure having the valve being movable to various positions as regards the alignment of projected or reflected sound waves to react to the compression phases of the sound waves at different locations in the path of the sound waves.

11. In an acoustic testing apparatus as claimed in claim 9, the structure having the valve and that having the expansion chamber being rigidly connected together and movable as a unit to various positions in alignment with projected or reflected sound whereby an indication may be obtained of different characteristics of the sound waves in accordance with the difference of position of the reception of such sound waves.

12. In an acoustic testing apparatus, the combination of a sound amplitude indicator having a structure with an expansible chamber with an expansion indicating means and a rectifying valve, said rectifying valve having a flexible member secured at its entire periphery having a resilient portion with an opening responsive to the compression phases of sound waves to open and pass a portion of the sound transmitting medium to said chamber, said opening closing on the rarefaction phases of the sound waves, means to reflect sound, and means to align the valve with the reflected sound to obtain a maximum influence by such reflected sound in accordance with the distance of the valve from the point of reflection.

13. In an acoustic testing apparatus, a sound amplitude indicator having, in combination, a structure with an expansible chamber, means to indicate the expansion of such chamber, a sound rectifying valve connected to the chamber, said valve having an opening to respond to the compression phases of sound waves transmitting a portion of the sound transmitting medium at the compression phases, said valve closing on the rarefaction phases, the trapped medium expanding said chamber, means to concentrate reflected sounds, the means to concentrate the sound comprising a parabolic reflector, and means to position the valve at the focus of said reflector, a tube connecting the valve and chamber, and means to align the reflector with its axis in the path of reflected sound waves.

WILLIAM F. ALDER.